United States Patent
Lee et al.

(10) Patent No.: US 8,948,934 B2
(45) Date of Patent: Feb. 3, 2015

(54) METHODS AND SYSTEMS FOR VEHICLE BROADBAND CONNECTION TO A DATA NETWORK

(75) Inventors: Donald B. Lee, Shoreline, WA (US); Anil Kumar, Sammamish, WA (US); Nha Thanh Nguyen, Shoreline, WA (US); Timothy McNally Mitchel, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/606,119

(22) Filed: Sep. 7, 2012

(65) Prior Publication Data

US 2014/0074321 A1 Mar. 13, 2014

(51) Int. Cl.
*G06F 19/00* (2011.01)
*H04W 4/04* (2009.01)
*H04B 3/54* (2006.01)

(52) U.S. Cl.
USPC ............... 701/3; 307/9.1; 370/464; 375/257; 455/430; 455/431

(58) Field of Classification Search
None
See application file for complete search history.

(56) References Cited

U.S. PATENT DOCUMENTS

| | | | |
|---|---|---|---|
| 6,751,979 B2 | 6/2004 | Leathers | |
| 7,075,414 B2 | 7/2006 | Giannini et al. | |
| 7,412,840 B2 | 8/2008 | Leathers | |
| 7,461,516 B2 * | 12/2008 | Leadingham et al. | 62/236 |
| 7,893,557 B2 * | 2/2011 | Davis et al. | 307/9.1 |
| 8,094,605 B2 * | 1/2012 | Lynch et al. | 370/316 |
| 8,504,019 B2 * | 8/2013 | Lynch et al. | 455/430 |
| 2002/0160773 A1 * | 10/2002 | Gresham et al. | 455/431 |
| 2003/0208764 A1 * | 11/2003 | Galipeau et al. | 725/76 |
| 2004/0140673 A1 | 7/2004 | McCool | |
| 2005/0044564 A1 * | 2/2005 | Stopniewicz et al. | 725/37 |
| 2005/0143868 A1 * | 6/2005 | Whelan | 701/1 |
| 2008/0195259 A1 * | 8/2008 | Davis et al. | 701/1 |
| 2008/0240029 A1 | 10/2008 | Lynch et al. | |
| 2008/0296095 A1 | 12/2008 | Frank | |
| 2012/0099627 A1 | 4/2012 | Mitchell et al. | |
| 2013/0003756 A1 * | 1/2013 | Mitchell et al. | 370/464 |
| 2014/0049099 A1 * | 2/2014 | Sampigethaya et al. | 307/1 |

FOREIGN PATENT DOCUMENTS

| | | |
|---|---|---|
| EP | 0890907 A1 | 1/1999 |
| EP | 2111691 B1 | 1/2011 |
| EP | 2445119 A1 | 4/2012 |
| WO | 2008097983 A1 | 8/2008 |

OTHER PUBLICATIONS

International Search Report and Written Opinion of International Application No. PCT/US2013/053863; Oct. 29, 2013; 9 pages.

* cited by examiner

*Primary Examiner* — James Trammell
*Assistant Examiner* — Demetra Smith-Stewart
(74) *Attorney, Agent, or Firm* — Armstrong Teasdale LLP

(57) ABSTRACT

Methods and systems for communicating data between a vehicle and a ground-based unit are provided. The method includes communicatively coupling the vehicle to the ground-based unit, initiating a Broadband over Power Line (BPL) link between the vehicle and the ground-based unit when power is supplied to the vehicle, and updating data stored in the vehicle with data received from the ground-based unit.

19 Claims, 3 Drawing Sheets

METHODS AND SYSTEMS FOR VEHICLE BROADBAND CONNECTION TO A DATA NETWORK

BACKGROUND

This invention relates generally to vehicle communication, and more particularly to vehicle broadband communication with a data network.

As technology has increased, an amount of software and data needed on-board vehicles has increased as well. This increased need is particularly evident in aircraft information systems. Generally, aircrafts receive off-board data used during flight through a variety of methods. For example, cellular and/or satellite networks enable an aircraft to communicate to proprietary networks via the internet while the aircraft is in flight. However, such networks are limited by cellular or satellite connectivity.

In at least some known commercial airports, a GateLink™ network exists that enables aircraft to communicate wirelessly with the GateLink™ network, which in turn, wirelessly connects to an airport data network. However, some commercial aircraft data cannot be sent via wireless networks due to regulations governing aircraft communications. While such options may be available at some large commercial airports, because of cost limitations, technology limitations, and other factors, many regional airports and/or military air fields do not have GateLink™ capabilities.

Accordingly, there is a need for methods and systems that enable broadband over power line (BPL) communications when conventional data exchange services are not available.

BRIEF DESCRIPTION

In one aspect, a method for communicating data between a vehicle and a ground-based unit is provided. The method includes communicatively coupling the vehicle to the ground-based unit, initiating a Broadband over Power Line (BPL) link between the vehicle and the ground-based unit when power is supplied to the vehicle, and updating data stored in the vehicle with data received from the ground-based unit.

In another aspect, a ground-based power cart configured to transmit data to a vehicle is provided. The power cart includes a Broadband over Power Line (BPL) module configured to provide data to a vehicle via a power line and a communications device configured to communicate between the power cart and a ground-based network.

In yet another aspect, a system for communicating between a vehicle and a ground-based unit is provided. The system includes a vehicle and a ground-based power cart communicatively coupled to the vehicle. The ground-based power cart includes a Broadband over Power Line (BPL) module configured to provide data to a vehicle via a power line and a communications device configured to communicate between the power cart and a ground-based network.

The features, functions, and advantages that have been discussed can be achieved independently in various embodiments or may be combined in yet other embodiments further details of which can be seen with reference to the following description and drawings.

DETAILED DESCRIPTION

Embodiments described herein enable vehicle broadband communication with a data network. More particularly, the present invention is directed to using broadband over power line (BPL) communications using a power cart to enable aircraft information exchange to occur where conventional data exchange services are not available.

Figure 1:
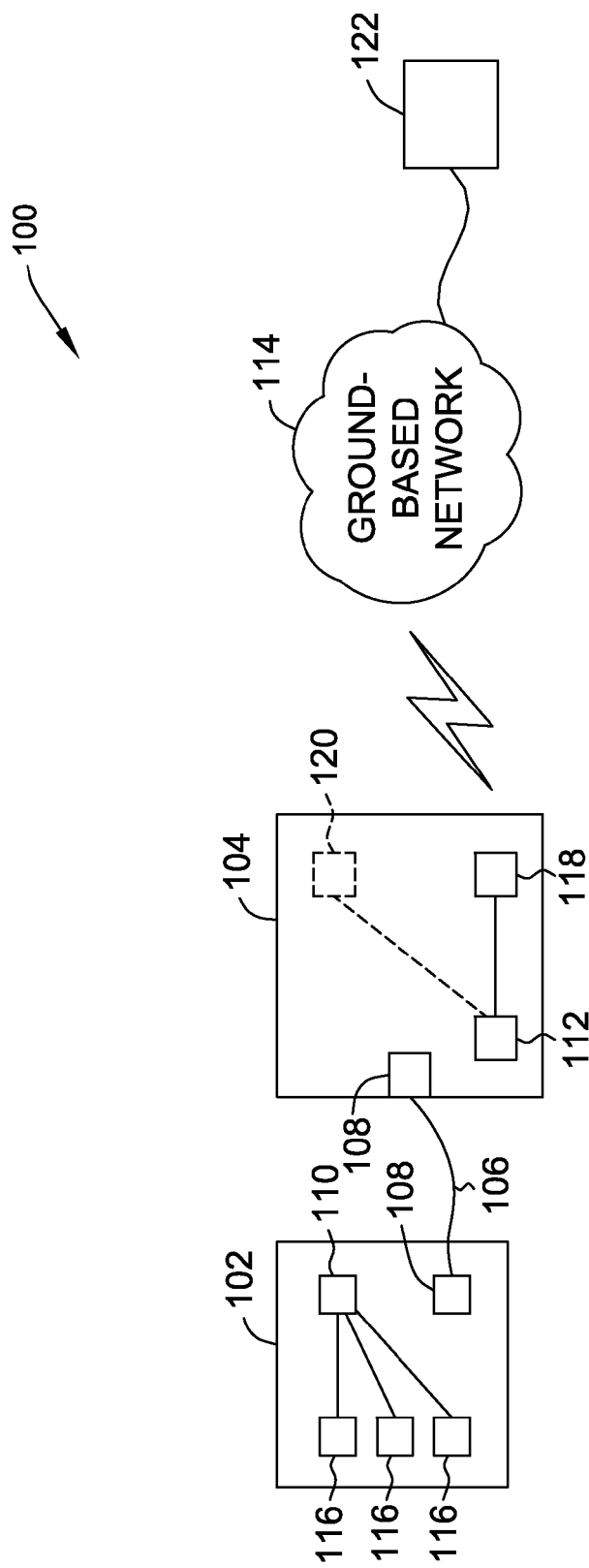
FIG. 1 is a diagram of an exemplary system that enables vehicle broadband communication with a data network.

FIG. 1 is a diagram of an exemplary system 100 for facilitating vehicle broadband communication with a data network 114. System 100 works with an aircraft 102 on the ground at an airport (not shown). As used herein the term "airport" refers to any location in which aircraft, such as fixed-wing aircraft, helicopters, and/or blimps, take off and land. System 100 includes a power system 104 that supplies power to aircraft 102. In the exemplary embodiment, power system 104 is a ground-based power cart, i.e., a ground power unit, that is mobile and that supplies power to an aircraft parked on the ground at locations at or adjacent to the airport. In one embodiment, power system 104 may be a conventional power delivery system used at least some known airports. Power system 104 is coupled to aircraft 102 when aircraft 102 is parked at the airport. An electrical cable 106, e.g., a power stinger cable, couples aircraft 102 to power system 104 via at least one stinger socket 108. Power system 104 may be configured to provide 400 Hz power to the aircraft via the electric cable 106, however any suitable power for a particular type of aircraft or vehicle coupled via electric cable 106 may be provided.

In the exemplary embodiment, aircraft 102 includes an on-board BPL module 110 that enables communication via electrical cable 106. More particularly, in the exemplary embodiment, on-board BPL module 110 is capable of communicating with an off-board BPL module 112. In the exemplary embodiment, BPL module 110 is communicatively coupled to on-board networks 116. On-board networks 116, such as, but not limited to, in-flight entertainment systems, avionics systems, flight control systems, flight bag(s), and/or cabin systems.

In the exemplary embodiment, power system 104 is integrated with off-board BPL module 112 and coupled to a computing device 120 that can communicate directly with aircraft 102 to transfer data to networks 116. In the exemplary embodiment, module 112 is also coupled to a transceiver 118 that is communicatively coupled to a ground-based network 114. For example, in one embodiment, transceiver 118 is a wireless transceiver that transmits data to/from network 114. Transceiver 118 may be wirelessly coupled to network 114 or physically coupled to network 114 through a wired connection. It should be noted that transceiver 118 may communicate with network 114 using any protocol that enables broadband communication as described herein.

In the exemplary embodiment, aircraft 102 can receive electrical power from power system 104 via electrical cable 106 and may send/receive data communications to/from ground-based network 114 via cable 106. Moreover, in the exemplary embodiment, aircraft 102 communicates via on-board BPL module 110 using TCP/IP, however any other suitable protocol can be used. In one embodiment, encryption is employed to further secure communications between aircraft 102 and ground-based network 114 and/or computing device 120.

Ground-based network 114 may be communicatively coupled to a server 122 that may be operated by the airline or entity that operates aircraft 102. Alternatively, server 122 may be operated by a third-party, such as the airport, an aircraft manufacturer, and/or an aircraft service provider. For example, server 122 may be coupled to ground-based network 114 via a LAN, a WAN, and/or the Internet. Server 122 may transmit data to and from aircraft 102. For example, server 122 may provide software and/or firmware updates to components of aircraft 102, such as cabin systems software, flight bag, and avionics software. Server 122 may also provide content, such as music, movies, and/or internet data such as cached web content for in-flight entertainment systems on aircraft 102.

Although FIG. 1 illustrates power system 104 as being coupled to electrical cable 106 via off-board BPL module 112, it should be appreciated that other configurations that enable off-board BPL module to function as described herein are possible. For example, off-board BPL module 112 may communicate wirelessly with module 110 when aircraft 102 is directly coupled to power system 104 via electrical cable 106. As another example, off-board BPL module 112 may be configured to communicate wirelessly with the aircraft via computing device 120 while at the same time, communicate via electrical cable 106 when power is supplied from power system 104 to the aircraft 102.

Figure 2:
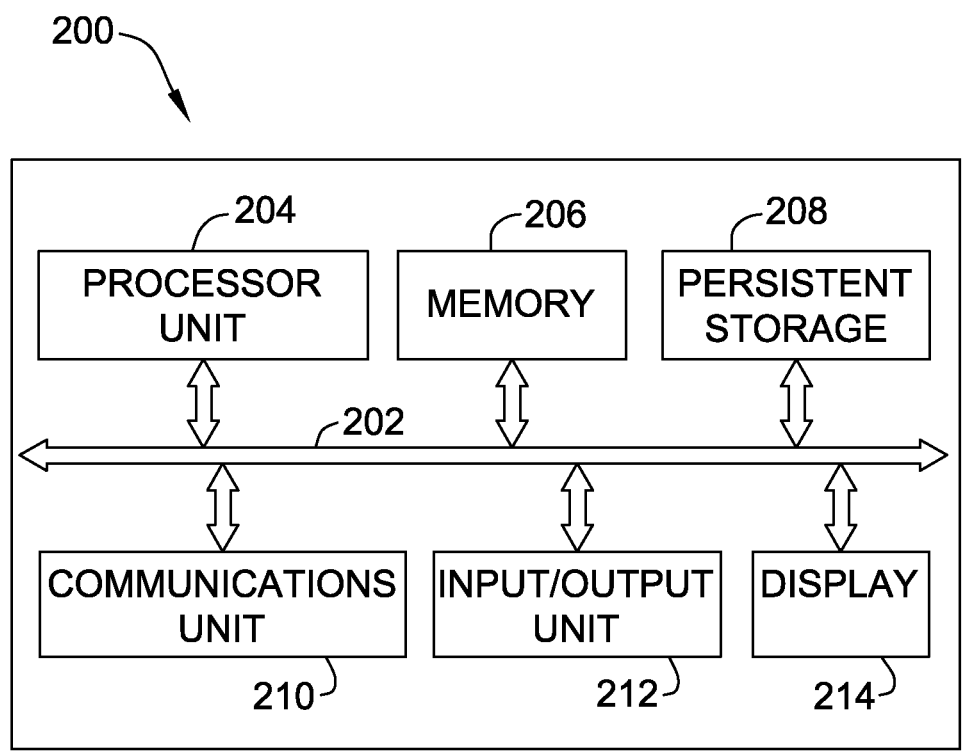
FIG. 2 is a block diagram of an exemplary computing device that may be used with the system shown in FIG. 1.

FIG. 2 is a block diagram of an exemplary computing device 200 that may be used with system 100 (shown in FIG. 1). In the exemplary embodiment, computing device 200 is incorporated into power system 104. However, it should be noted that computing device 200 may be a separate device that cooperates with power system 104 such as computing device 120. In the exemplary embodiment, computing device 200 includes a communications fabric 202 that enables communications between a processor unit 204, a memory 206, persistent storage 208, a communications unit 210, an input/output (I/O) unit 212, and a presentation interface, such as a display 214. In addition to, or in the alternative, presentation interface 214 may include an audio device (not shown) and/or any device capable of conveying information to a user.

Processor unit 204 executes instructions for software that may be loaded into memory 206. Processor unit 204 may be a set of one or more processors or may include multiple processor cores, depending on the particular implementation. Further, processor unit 204 may be implemented using one or more heterogeneous processor systems in which a main processor is present with secondary processors on a single chip. In another embodiment, processor unit 204 may be a homogeneous processor system containing multiple processors of the same type.

Memory 206 and persistent storage 208 are examples of storage devices. As used herein, a storage device is any piece of hardware that is capable of storing information either on a temporary basis and/or a permanent basis. A storage device, such as memory 206 and/or persistent storage 208, may be configured to store data for use with the processes described herein. For example, a storage device may store data needed by networks 116 during flight.

Communications unit 210, in the exemplary embodiment, enables communications with other computing devices, systems, and/or networks. In the exemplary embodiment, communications unit 210 is a BPL module such as module 100 and module 112. In one embodiment, communications unit 210 also includes network interface card. Communications unit 210 may provide communications through the use of physical and/or wireless communication links, such as transceiver 118.

Input/output unit 212 enables input and output of data with other devices that may be connected to computing device 200. For example, without limitation, input/output unit 212 may provide a connection for user input through a user input device, such as a keyboard and/or a mouse. Further, input/output unit 212 may transmit output to a printer. Display 214 provides a mechanism to display information to a user. For example, a presentation interface such as display 214 may display a graphical user interface, such as those described herein.

The different components illustrated herein for computing device 200 are not architectural limitations to the manner in which different embodiments may be implemented. Rather, the different illustrative embodiments may be implemented in a computer system including components in addition to or in place of those illustrated for computing device 200. For example, other components shown in FIG. 2 can be varied from the illustrative examples shown.

During operation, and referring to FIGS. 1 and 2, aircraft 102 is connected to a ground power unit (GPU), e.g., ground power unit 104, via electric cable 106, e.g., a power stinger cable. The authorized ground personnel activates off-board BPL module 112 and completes an authentication procedure using off-board BPL module 112, display 214, and/or I/O unit 212. A pilot, maintenance crewmember, or other authorized user activates an on-board BPL module, (e.g., on-board BPL module 110). On-board BPL module 110 establishes communication with off-board BPL module 112. Aircraft 102 is then coupled to off-board BPL modules 112 via electric cable 106 and is coupled to ground-based network 114, server 122, computing device 120, and/or the Internet. Communication between aircraft 102 and power unit 104 may be initiated autonomously or at the direction of a user, such as a pilot or ground crew member.

Figure 3:
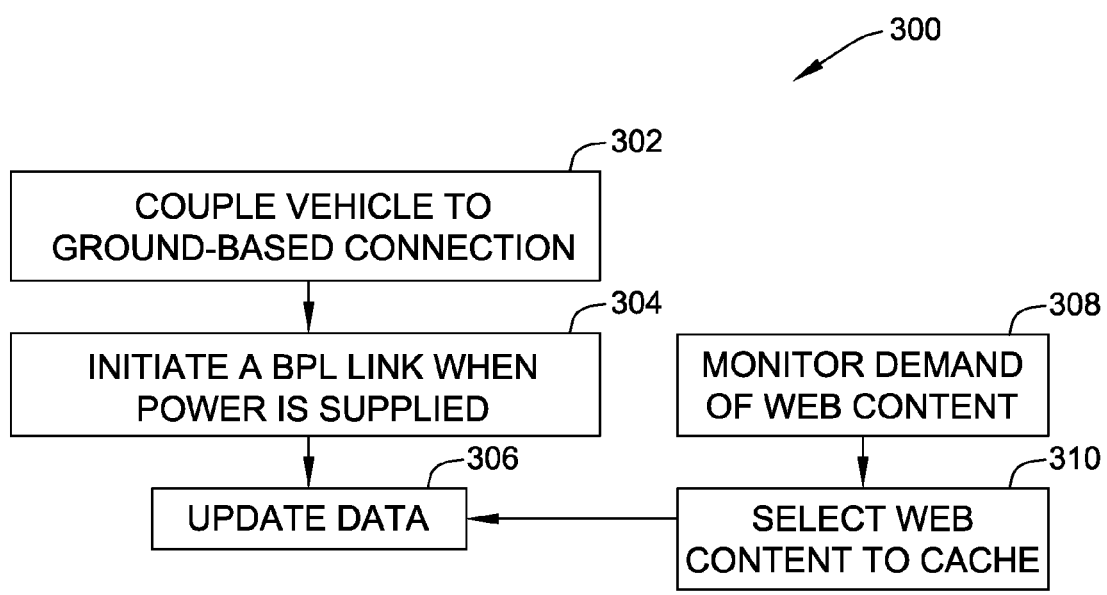
FIG. 3 is a flowchart of an exemplary method that may be implemented to enable vehicle broadband communication with a data network.

FIG. 3 is a flowchart of an exemplary method 300 that may be implemented to enable vehicle broadband communication with a data network. In the exemplary embodiment, a vehicle, e.g., aircraft 102, is coupled 302 to a ground-based unit, such as power unit 104, via an electrical cable 106. When power is supplied to the vehicle, a BPL link from module 110 to module 112 is initiated 304. In the exemplary embodiment, data is then transferred and/or updated 306 between the vehicle and network 114 and/or computing device 120.

In one embodiment, during flight, demand of web content is monitored 308 by aircraft 102. In such an embodiment, web content with the highest demand is selected 310 to be cached. The selected 310 web content is cached and updated 306 when aircraft 102 is on the ground and connected to power unit 104 such that the selected 310 content may be available for subsequent travel.

Accordingly, in the exemplary embodiment, a system enables vehicle broadband communication with a data network. As compared to known communication methods and systems used for airport-based aircraft communications, the above-described communication systems and methods enable an aircraft to achieve BPL communications where conventional data exchange services are not available. Although aircraft have been used as an example throughout, it is contemplated that other vehicles, such as electric and/or maritime vehicles, may be used with the methods and systems described herein.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modules, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for communicating data between a vehicle and a mobile ground-based unit, said method comprising:
    communicatively coupling the vehicle to the mobile ground-based unit;
    initiating a Broadband over Power Line (BPL) link between the vehicle and the mobile ground-based unit when power is supplied to the vehicle;
    communicatively coupling the mobile ground-based unit to a ground-based network using a communications device configured to communicate data received from the vehicle between the mobile ground-based unit and the ground-based network, wherein the mobile ground-based unit is configured to enable vehicle information exchange to occur with the ground-based network in remote settings without a wired power infrastructure; and
    updating data stored in the vehicle with data received from the mobile ground-based unit.

2. The method in accordance with claim 1, wherein communicatively coupling the vehicle to the mobile ground-based unit further comprises wirelessly coupling the vehicle to the mobile ground-based unit.

3. The method in accordance with claim 1, wherein communicatively coupling the vehicle to the mobile ground-based unit further comprises communicatively coupling an aircraft to the mobile ground-based unit.

4. The method in accordance with claim 3, wherein communicatively coupling the vehicle to the mobile ground-based unit further comprises coupling the mobile ground-based unit to a stinger of the aircraft via a stinger.

5. The method in accordance with claim 1, wherein updating data further comprises updating data using cached web content that may be later accessed.

6. The method in accordance with claim 5, wherein updating data using cached web content further comprises selecting web content to cache based on network demand incurred before the vehicle is coupled to the mobile ground-based unit.

7. The method in accordance with claim 1, wherein communicatively coupling the vehicle to the ground-based unit further comprises communicatively coupling the vehicle to a mobile power cart.

8. A mobile ground-based power cart configured to transmit data to a vehicle, said power cart comprising:
    a Broadband over Power Line (BPL) module configured to provide data to and receive data from a vehicle, the data transmitted via a power line; and
    a communications device communicatively coupled to said BPL module and configured to communicate the data between said power cart and a ground-based network, wherein said power cart is configured to enable vehicle information exchange to occur with the ground-based network in remote settings without a wired power infrastructure.

9. A ground-based power cart in accordance with claim 8, wherein said power cart is configured to provide 400 Hz power to the vehicle via the power line.

10. A ground-based power cart in accordance with claim 8, wherein said BPL module is further configured to wirelessly transmit data to the vehicle when power is supplied from said mobile ground-based power cart to the vehicle.

11. A ground-based power cart in accordance with claim 8, wherein said mobile ground-based power cart is further configured to update data stored in the vehicle with data said mobile ground-based power cart.

12. A ground-based power cart in accordance with claim 8, wherein said mobile ground-based power cart is further configured to update data using cached web content that may be accessed during travel.

13. A ground-based power cart in accordance with claim 8, wherein said communications device is further configured to wirelessly communicate with the ground-based network.

14. A system for communicating between a vehicle and a ground-based network, said system comprising:
- a vehicle; and
- a mobile ground-based power cart communicatively coupled to said vehicle, said mobile ground-based power cart comprising:
  - a Broadband over Power Line (BPL) module configured to provide data to and receive data from a vehicle, the data transmitted via a power line; and
  - a communications device communicatively coupled to said BPL module and configured to communicate the data between said power cart and a ground-based network, wherein said power cart is configured to enable vehicle information exchange to occur with the ground-based network in remote settings without a wired power infrastructure.

15. The system in accordance with claim 14, wherein said power cart is configured to provide 400 Hz power to said vehicle via the power line.

16. The system in accordance with claim 14, wherein said BPL module is further configured to wirelessly transmit data to said vehicle when power is supplied from said mobile ground-based power cart to said vehicle.

17. The system in accordance with claim 14, wherein said mobile ground-based power cart is further configured to update data stored in said vehicle with data from the ground-based unit.

18. The system in accordance with claim 14, wherein said mobile ground-based power cart is further configured to update data using cached web content that may be accessed during travel.

19. The system in accordance with claim 14, wherein said communications device is further configured to wirelessly communicate with the ground-based network.

* * * * *